(12) United States Patent
Chen et al.

(10) Patent No.: US 8,081,676 B2
(45) Date of Patent: Dec. 20, 2011

(54) METHOD AND APPARATUS FOR DATA RECEPTION

(75) Inventors: Chien Ming Chen, Hisin-Chu (TW); Wen-Chang Chang, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 848 days.

(21) Appl. No.: 12/050,216

(22) Filed: Mar. 18, 2008

(65) Prior Publication Data

US 2008/0279316 A1 Nov. 13, 2008

Related U.S. Application Data

(60) Provisional application No. 60/916,581, filed on May 8, 2007.

(51) Int. Cl.
*H03H 7/30* (2006.01)
*H03H 7/40* (2006.01)
*H04B 1/10* (2006.01)
*H04B 3/04* (2006.01)

(52) U.S. Cl. ........... 375/231; 375/232; 375/350; 333/18

(58) Field of Classification Search ......... 375/229–232, 375/234–236, 340, 316, 326; 333/18, 28 R
See application file for complete search history.

(56) References Cited

U.S. PATENT DOCUMENTS

| | | | |
|---|---|---|---|
| 5,214,670 A * | 5/1993 | Ballatore | 375/231 |
| 6,369,741 B1 * | 4/2002 | Demicheli et al. | 341/155 |
| 6,744,330 B1 * | 6/2004 | Jones et al. | 333/28 R |
| 6,819,166 B1 | 11/2004 | Choi et al. | |
| 7,313,208 B2 * | 12/2007 | Frahm et al. | 375/350 |
| 7,502,411 B2 * | 3/2009 | Kim et al. | 375/229 |
| 7,545,859 B2 * | 6/2009 | Reichard | 375/232 |
| RE42,021 E * | 1/2011 | Pollmann et al. | 375/222 |
| 2004/0165303 A1 * | 8/2004 | Wu et al. | 360/65 |
| 2004/0252754 A1 * | 12/2004 | Wood et al. | 375/232 |
| 2005/0008070 A1 * | 1/2005 | Wang et al. | 375/232 |
| 2005/0052255 A1 * | 3/2005 | Chiang | 333/18 |
| 2005/0186933 A1 * | 8/2005 | Trans | 455/296 |
| 2005/0195894 A1 | 9/2005 | Kim et al. | |
| 2005/0201757 A1 * | 9/2005 | Bohn et al. | 398/149 |
| 2005/0270076 A1 * | 12/2005 | Huang et al. | 327/119 |
| 2005/0271173 A1 | 12/2005 | Chou et al. | |
| 2006/0013295 A1 * | 1/2006 | Kuijk et al. | 375/229 |
| 2006/0176988 A1 * | 8/2006 | Sohn et al. | 375/348 |
| 2006/0188043 A1 * | 8/2006 | Zerbe et al. | 375/346 |
| 2008/0019435 A1 * | 1/2008 | Chou | 375/232 |

OTHER PUBLICATIONS

Nagano et al., A 0.13um CMOS Ultra-Compact DVD SoC Employing A Full Digital Equalizing PRML Read Channel, 2004, Custom Integrated Circuits Conference, 2004. Proceedings of the IEEE 2004, pp. 283-286.*

(Continued)

*Primary Examiner* — Tesfaldet Bocure
*Assistant Examiner* — Lawrence Williams
(74) *Attorney, Agent, or Firm* — Thomas|Kayden (57) ABSTRACT

Method and apparatus for data reception are provided, retrieving digital values transmitted through a cable. In a data receiver, an equalizer equalizes an input signal based on a boost value to generate an equalized signal, and a data extractor samples the equalized signal to extract output values from each symbol period. The data extractor detects signal quality of the equalized signal to adjust the boost value accordingly. An optimal time point is detected within one symbol period where an output value is an ensured valid, and variation rate of the optimal time point is counted as an inverse indicator of the signal quality.

14 Claims, 6 Drawing Sheets

OTHER PUBLICATIONS

Bollati et al., An Eight-Order CMOS Low-Pass Filter With 30-120 MHz Tuning Range and Programmable Boost, 2001, Solid-State Circuits, IEEE Journal of, vol. 36, Issue: 7, pp. 1056-1066.*

Bolatti et al., An Eight-Order Lowpass Filter With 5-100 MHz Tuning Range and Programmable Boost, 1999, Solid-State Circuits Conference, 1999. ESSCIRC '99 Proceedings of the 25th European, pp. 50-53.*

* cited by examiner

METHOD AND APPARATUS FOR DATA RECEPTION

CROSS REFERENCE TO RELATED APPLICATIONS

This application claims the benefit of U.S. Provisional Application No. 60/916,581 filed on May 8, 2007.

BACKGROUND OF THE INVENTION

1. Field of the Invention

The invention relates to high speed cable links, and in particular, to adaptive data reception for signals transferred through a cable.

2. Description of the Related Art

Figure 1:
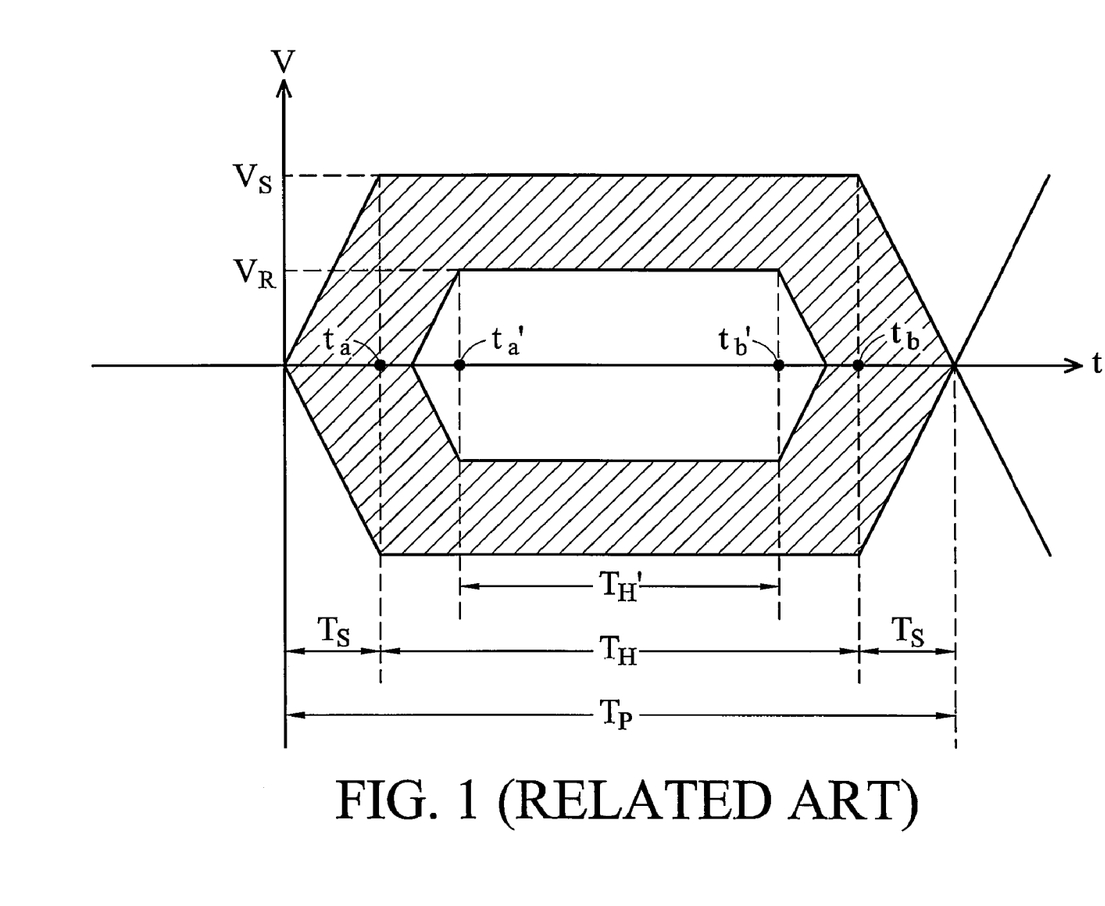
FIG. 1 shows a eye diagram.

FIG. 1 shows an eye diagram. Cables or conductive wires are widely used media for signal transmission, in which digital data are sequentially transmitted in symbol form. A symbol may be an application dependent waveform having predetermined amplitude and duration. For example, in FIG. 1, a symbol generated at the transmitter end may have amplitude $V_S$ and data period $T_P$. During the data period $T_P$, a duration between time points $t_a$ and $t_b$ is referred to as the hold time $T_H$, whereas the others setup time $T_S$. A valid symbol value is only acquirable during the hold time $T_H$ where the symbol amplitude is kept at a desirable level. For a high speed cable link, the symbol is transmitted through a cable and sampled at a receiver end. Ideally, the symbol received at the receiver end remains a proper waveform so that the original output value can still be correctly acquired by sampling the symbol within the hold time $T_H$. Practically, however, a cable is equivalent to a low pass filter that reduces signal quality. Not only is amplitude decayed but time delay is induced to different extents at different frequency bands. Thus, a distorted symbol may cause a so-called data jitter, reducing the possibility to correctly sample an output value. Since the transition edges in a non-ideal cable are uncertain, the available hold time where correctness is ensured, is shortened. For example, the duration between time points $t_a'$ and $t_b'$ represents the hold time $T_H'$ being shortened due to data jitter. As the available hold time $T_H'$ is shortened, duration of uncertainty is increased and implementation of an accurate sampling mechanism becomes more difficult.

Figure 2:
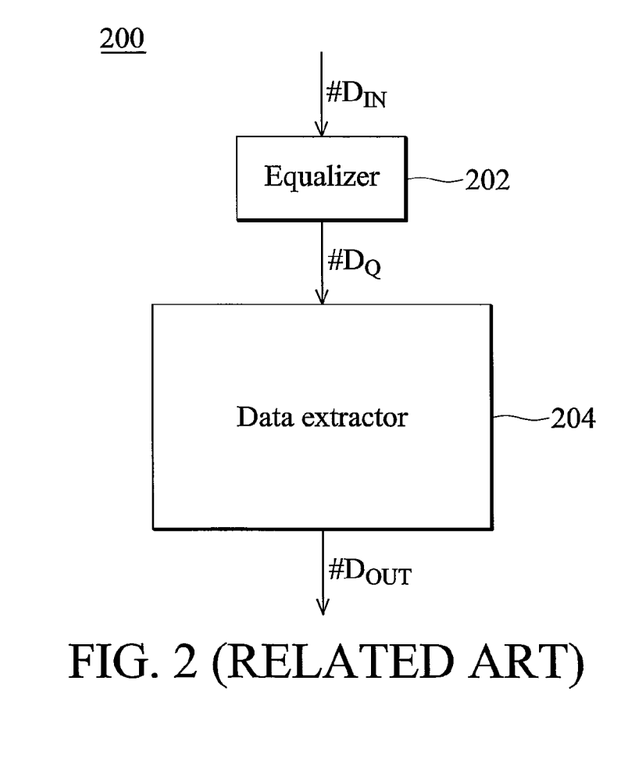
FIG. 2 shows a conventional data receiver 200 at the receiving end of a cable.

FIG. 2 shows a conventional data receiver 200 at the receiving end of a cable. The data extractor 204 is designed to acquire output values #$D_{OUT}$ from the input signal #$D_{IN}$ that has passed through the cable (not shown). The input signal #$D_{IN}$ may be distorted when passing through the cable, having data jitter that is difficult to reacquire output values therefrom. Thus, an equalizer 202 may be provided to equalize the input signal #$D_{IN}$ before it is sent to the data extractor 204. The equalization is a mathematical function that reverses the distortion effects induced by the cable, and the equalizer 202 is typically configured with a fixed boost value as a parameter for the mathematical function, thereby the distorted input signal #$D_{IN}$ can be recovered from an equalized signal #$D_Q$ having quality subsequently approximating to the original symbol. In this way, the correctness of output value #$D_{OUT}$ obtained by the data extractor 204 can be efficiently improved.

The distortion caused by different cables may vary. For example, the input signal #$D_{IN}$ may feature different characteristics dependent on the frequencies, cable lengths and cable materials. Thus, if an equalizer 202 with fixed boost value is applied for unknown cable feature, under equalization or over equalization may consequently occur. Under equalization, in particular, often causes severe data jitter that greatly impacts efficiency of signal transmission. Therefore, an enhancement for the equalizer 202 is desirable.

BRIEF SUMMARY OF THE INVENTION

An exemplary embodiment of a data receiver is provided, retrieving digital values transmitted through a cable. In which an equalizer equalizes an input signal based on a boost value to generate an equalized signal, and a data extractor samples the equalized signal to extract output values from each symbol period. The data extractor detects signal quality of the equalized signal to adjust the boost value accordingly.

The data extractor may comprise a boost value generator for control of the boost value, by which the boost value is adjusted dynamically based on the signal quality detected by the data extractor.

As soon as the data receiver is initialized in calibration mode, the boost value generator incrementally adjusts the boost value of the equalizer at a plurality of symbol periods. The data extractor analyzes signal quality of the equalized signal in response to the incremental adjustments. Upon signal quality improvement saturation at an optimal boost value level, the boost value generator stops the incremental adjustment, and the equalizer switches to normal mode and operates at the optimal boost value.

The data extractor further comprises an over sampler, sampling the equalized signal for a plurality of symbol periods, and acquiring a plurality of sampled values per symbol period. A buffer is provided for storage of the sampled values. An edge detector detects transition edges of the equalized signal according to the sampled values, and asserts a location signal to indicate the location of transition edges per symbol period. A quality controller then analyzes the locations of transition edges, thereby one optimal sampled value is selected as an output value for each symbol period. As an example, the over sampler samples the equalized signal at five different time points during the symbol period to acquire five sampled values, thereafter, the quality controller selects one of the sampled values to be the output value, which is associated with a time point most closest to the center of the two transition edges within the symbol period.

The quality controller analyzes variation rate of the time point as an inverse index of the signal quality of the equalized signal. Specifically, the quality controller detects whether the time point has changed since the last symbol periods, and the variation rate is obtained by counting the total amount of changes made to the time point within a long period.

Another embodiment provides a data retrieval method implemented in the data receiver, and a detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
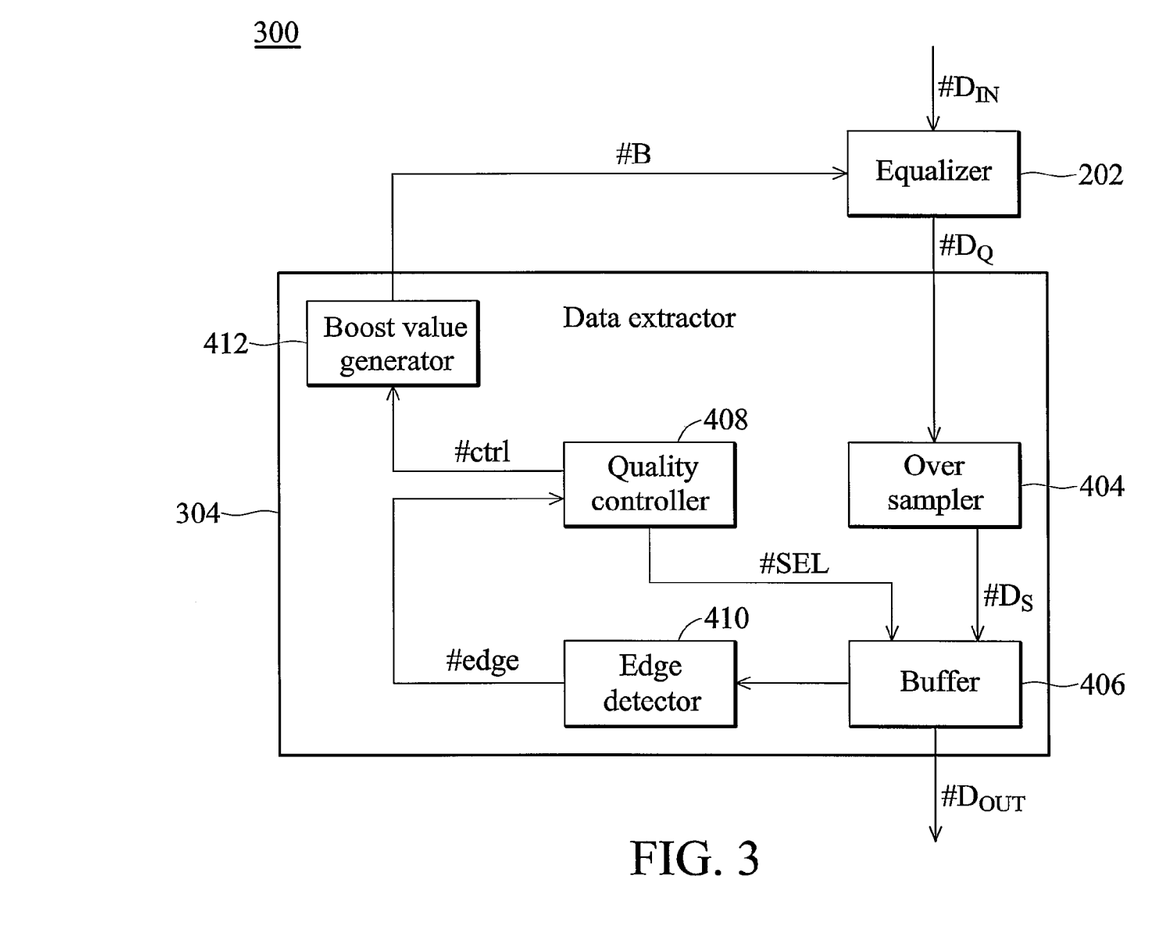
FIG. 3 shows an embodiment of a data receiver 300 according to the invention.

FIG. 3 shows an embodiment of a data receiver 300 according to the invention. The data receiver 300 comprises a data extractor 304 for sampling the equalized signal $\#D_Q$ and outputting an output value $\#D_{OUT}$. The data extractor 304 is also able to detect signal quality of the equalized signal $\#D_Q$ and accordingly adjust the boost value of equalizer 202. In the embodiment, a boost value generator 412 is dedicated to provide the boost value. The boost value may be dynamically adjusted according to the signal quality detected by the data extractor 304.

The adjustment may be performed by various approaches. For example, the data extractor 304 may perform a calibration to directly determine an optimal boost value associated with the present cable. First, the boost value generator 412 recursively and incrementally issues various boost values to the equalizer 202 during an interval containing multiple symbol periods $T_P$. The interval is used for calibration. The interval should contain sufficient symbol periods to get a meaningful result. In response to every incremental boost value, the data extractor 304 acquires corresponding quality information from the equalized signal $\#D_Q$. Basically, the estimated signal quality is proportional to the boost value, thus, the outcomes may organize a line of positive slope. When the signal quality is saturated no matter how the boost value increases, the boost value at the saturation point is deemed to be an optimal one. Hence, the boost value generator 412 stops the incremental adjustment, and the equalizer 202 switches to normal mode and operates at the optimal boost value.

In FIG. 3, the data extractor 304 uses an over sampler 404 to sample the equalized signal $\#D_Q$, by which a plurality of sampled values $\#D_S$ may be acquired per symbol period $T_P$. The sampled values $\#D_S$ are buffered in a buffer 406 for further analysis before an output value $\#D_{OUT}$ is determined. The buffer 406 has a capacity to store a plurality of sampled values $\#D_S$ correspondingly obtained from a plurality of consecutive symbol periods $T_P$, and an edge detector 410 reads them to detect locations of transition edges of each symbol period $T_P$. The equalizer 202 may use an inadequate boost value to equalize a distorted input signal $\#D_{IN}$, rendering an unstable equalized signal $\#D_Q$ in which transition edges rapidly change throughout consecutive symbol periods $T_P$. The more edge uncertainty increases, the shorter the hold time $T_H'$ where an output value is ensured valid. The edge detector 410 may determine the transition edges by comparing amplitude levels of two consecutive time points. For example, two sampled values $\#D_S$ sampled before and after the transition edge may have significant amplitude difference. A transition edge can be deemed found when the amplitude difference between two consecutive sampled values $\#D_S$ exceeds a predetermined threshold. The edge detection may also be accomplished by various conventional approaches, however, it is assumed that those skilled in the Art are knowledgeable of these approaches, thus, detailed examples are not provided further. Thereafter, the edge detector 410 sends a location signal #edge to the quality controller 408, providing location information of the transition edges of every symbol period $T_P$ for further analysis.

The quality controller 408 receives the location signal #edge, and accordingly selects one optimal sampled value #D as an output value $\#D_{OUT}$ of a symbol period $T_P$. Specifically, the over sampler 404 is performing an over-sampling operation whereby the equalized signal $\#D_Q$ is sampled at different phases within each symbol period $T_P$. For example, a symbol can be sampled at 5 different phases within one period to obtain 5 values of the equalized signal $\#D_Q$. According to the location signal #edge, the quality controller selects one of the sampled values $\#D_S$ to be the output value $\#D_{OUT}$, which is associated with a time point most close to the center of two transition edges within the symbol period $T_P$. In other words, if the first and fifth sampled values $\#D_S$ are deemed to be on the transition edges, the third sampled value $\#D_S$ would be chosen to be the output value $\#D_{OUT}$.

For the quality controller 408, there is a current pointer P pointing to the optimal phase (or time point) within a sample period. The current pointer P could be determined by previous 4 sample periods (S0, S1, S2, and S3). During the next 4 sample periods (S0', S1', S2', and S3'), the quality controller 408 determines transition edges of the sample periods (S0', S1', S2', and S3'). The quality controller 408 also checks whether the current pointer P is pointing to the middle of each sample period of the 4 sample periods (S0', S1', S2', and S3'). If the pointer P is pointing to the left side of the middle point of a sample period, the quality controller 408 may determine that the pointer P should jump up to be more close to the middle point. Conversely, if the pointer P is pointing to the right side of the middle point of a sample period, the quality controller 408 may determine that the pointer P should jump down to be more close to the middle point. In this embodiment, the quality controller 408 determines a jump up or jump down every 4 sample periods. Jump ups or downs are represented by a pointer shift flag. The quality controller 408 records the total number of shifts (jump ups or downs) over a long period (1000 sample periods for example). The more the number, the more frequently the pointer shifts. Frequent pointer shifts means that the quality of the equalized signal is poor. The shifts should be as less as possible. By testing several transfer functions of the equalizer 202, one can determine a best transfer function that results in minimum shifts. It means that the particular transfer function is the optimum choice to compensate the input signal $D_{IN}$.

Figure 4:
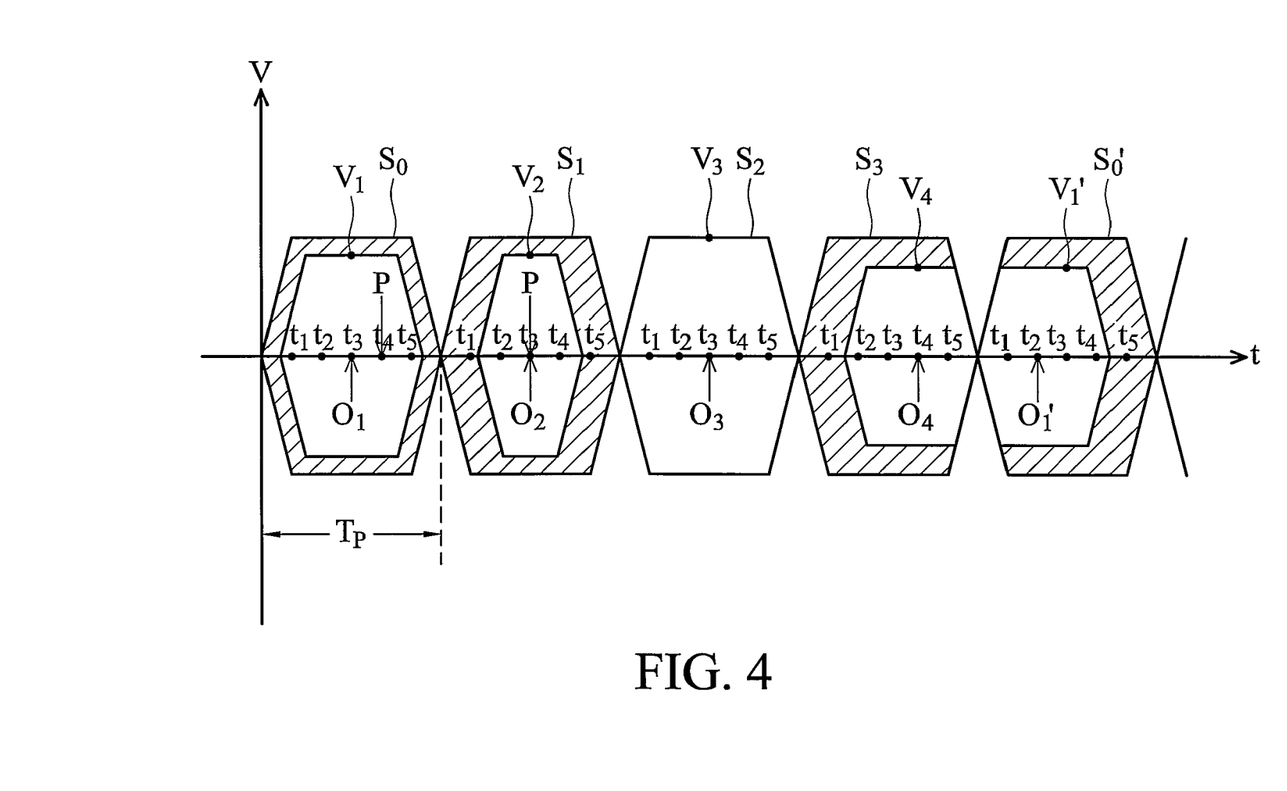
FIG. 4 shows an embodiment of sampling an equalized signal #$D_Q$.

FIG. 4 shows an embodiment of sampling an equalized signal $\#D_Q$. A plurality of consecutive symbol periods $T_P$ is illustrated, in which distortions are represented as shadowed areas where sampled data is deemed invalid. Four sampled values $\#D_S$ are obtained correspondingly at five time points t1 to t4 in each symbol period $T_P$, among which an optimal one would be selected as the output value $\#D_{OUT}$ (denoted as O1 to O4). In one symbol period $T_P$, the time points t1 to t4 may be five equivalently distributed points. The output value $\#D_{OUT}$ tends to be the most central one within the white area of each symbol period $T_P$. Other than that, amplitudes $V_1$ to $V_4$ of the output values $\#D_{OUT}$ O1 to O4 may also be considered as references for signal quality. Hence, the data extractor 304 sequentially receives and analyzes the equalized signals $\#D_Q$ and outputs corresponding output values $\#D_{OUT}$. Alternatively, the over sampler may comprise five different samplers each tracking a different phase in the symbol period $T_P$. The embodiment does not limit the implementation of the over sampler 404.

The optimal sampling point for the sample period S0 is t3, which is denoted by O1. However, the current pointer P may point to t4. The pointer P is pointing to the right side of O1. Therefore, for the sample period S0, it would be better to shift the current pointer P to t3, which is the optimal sampling point determined by the quality controller 408. Similarly, for the sample period S1, it would be better to shift the current pointer P to t3, which is the optimal sampling point determined by the quality controller 408. After checking 4 sample periods (S0-S3), the quality controller 408 may determine to shift the current pointer P to t3, and then proceeds similar checking flow during the next 4 sample periods (S0'-S3'). Obtaining 5 sampling points for each sample period and checking 4 sample periods to decide to shift the current pointer are merely an example. One can determine the number of sampling points for each sample period and the number of sample periods to be checked according to different design requirements.

Figure 5:
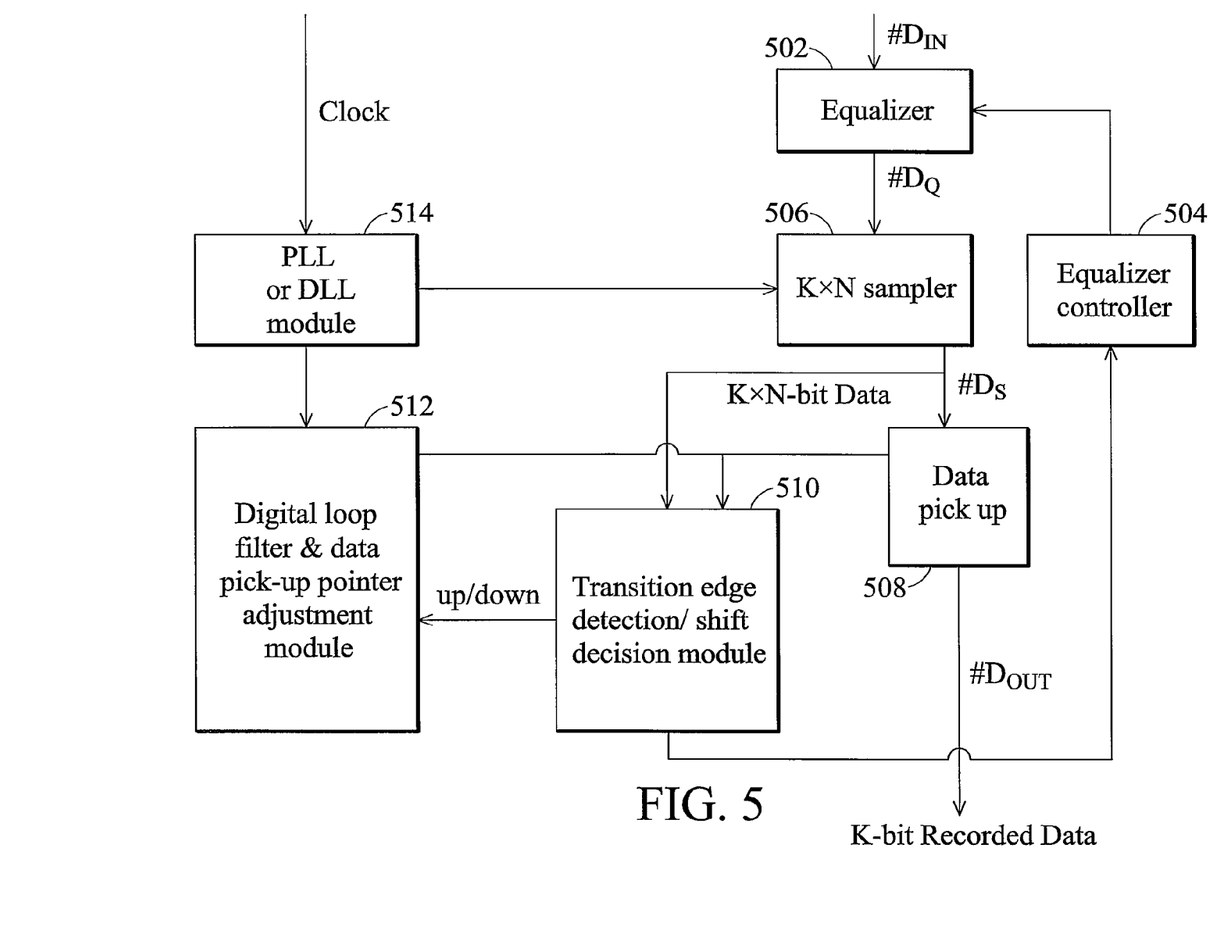
FIG. 5 is a more detailed embodiment of the data receiver 300 shown in FIG. 3.

FIG. 5 is a more detailed embodiment of the data receiver 300 shown in FIG. 3. With reference to FIG. 5, an input signal #$D_{IN}$ is distorted because of cable transmission. An equalizer 504 is used to compensate the distorted input signal #$D_{IN}$ and generates an equalized (compensated) signal #$D_Q$. The equalizer 502 has several transfer functions for a boost value to select. The equalized signal #$D_Q$ is determined by a selected transfer function. An over-sampling operation is performed by the K*N sampler 506. In this embodiment K can be 4 and N can be 5. A sample period of the equalized signal #$D_Q$ is sampled at 5 (K) different phases within a single period. 4 (N) consecutive sample periods (S0, St, S2, and S3) will be sampled 20 times at 20 different phases. In this embodiment, 20 sampled values are produced before determining the quality of the equalized signal #$D_Q$. However, the sampling number (K*N) is not a limitation. One can determine the sampling number depending on different design requirements.

The frequency of the input signal #$D_{IN}$ can be, for example, 1 G Hz. The clock frequency can be, for example, 100M Hz. A PLL or DLL module 514 can produce 20 sampling signals Fs, where each sampling signal Fs has a phase shift relative to another sampling signal. The 20 sampling signals Fs can be used by the K*N sampler 506 to sample 4 consecutive sample periods at 20 different phases and then produce 20 sampled values #$D_S$.

Subsequently, the 20 sampled values #$D_S$ are input to a data pick up 508. The data pick up 508 can be a buffer, which is corresponding to the buffer 406 in FIG. 3. The 20 sampled values #$D_S$ are then output as the output values #$D_{OUT}$.

A transition edge detection/shift decision module 510 also receives the 20 sampled values #$D_S$. The transition edge detection/shift decision module 510 determines the edges of the 4 consecutive sample periods. A current pointer P is stored in the transition edge detection/shift decision module 510. The current pointer P is determined by previous 4 consecutive sample periods. The transition edge detection/shift decision module 510 also determines the optimal sampling point for each sample period based on the 20 sampled values and the edges. The transition edge detection/shift decision module 510 compares the optimal sampling points (denoted by O1-O4 in FIG. 4) with the current pointer P (pointing to t4 in FIG. 4) and then determines whether to shift the current pointer P to a new position (denoted by P' hereafter). In the example given by FIG. 4, the current pointer P will shift left (jump down) to match the newly decided optimal sampling points O1-O4. The transition edge detection/shift decision module 510 sends shift instruction (up/down) to a digital loop filter & data pick-up pointer adjustment module 512.

The transition edge detection/shift decision module 510 also sends shift instruction (up/down) to an equalizer controller 504. Over a long period (1000 sample periods for example), the equalizer controller 504 accumulates the number of shifts (or jumps) of the current pointer P. The accumulated number of shifts denotes the quality of the compensation performed by the equalizer 502. The more the accumulated number, the worse the compensation is.

Then, based on the accumulated number, the equalizer controller 504 sends a boost value to the equalizer 502 to select another transfer function. The equalized signal #$D_Q$ is determined by the newly selected transfer function and then a next round of quality determination process is performed. During the next 1000 sample periods, the quality of the newly selected transfer function will be examined to see whether the compensation is better. After certain rounds, a best compensation quality using an optimal transfer function of the equalizer 502 will be picked and the calibration is accomplished. The following input signal #$D_{IN}$ can be compensated by the best transfer function the equalizer controller 504 could provide.

The transition edge detection/shift decision module 510 and the digital loop filter & data pick-up pointer adjustment module 512 are examples of the quality controller 408 shown in FIG. 3. The equalizer 202 is an example of the boost value generator 412.

Figure 6:
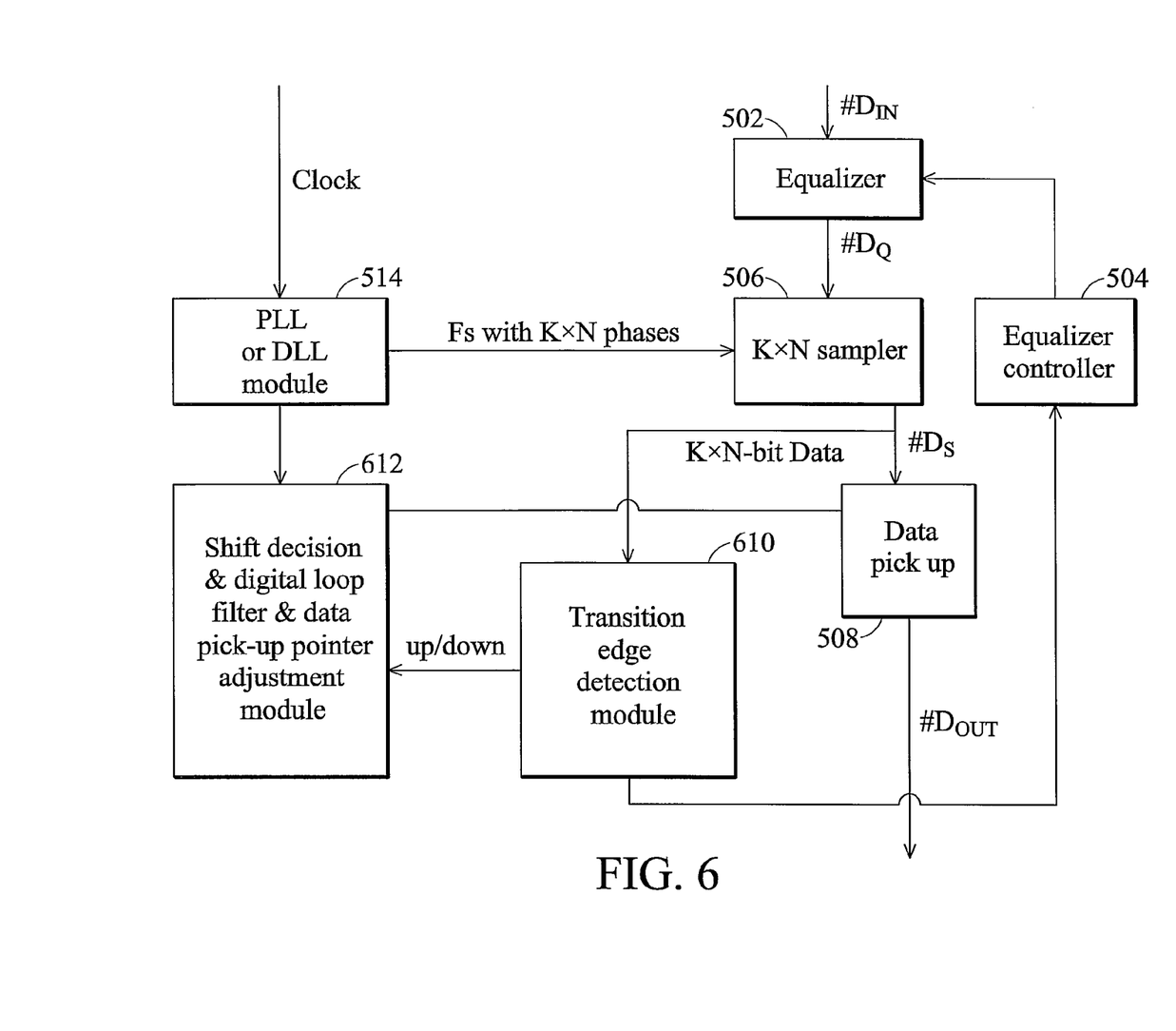
FIG. 6 shows another embodiment of the data receiver 300 shown in FIG. 3.

FIG. 6 shows another embodiment of the data receiver 300 shown in FIG. 3. The embodiment is the same as that shown in FIG. 5 except a transition edge detection module 610 and a shift decision & digital loop filter & data pick-up pointer adjustment module 612. Part of the functions performed by the transition edge decision and shift decision/shift decision module 510 is moved to the shift decision & digital loop filter & data pick-up pointer adjustment module 612. In this embodiment, the transition edge detection module 610 only takes care of transition edge determination and sends the edge information to the shift decision & digital loop filter & data pick-up pointer adjustment module 612.

The shift decision & digital loop filter & data pick-up pointer adjustment module 612 does most of the work, including shift of the current pointer P and data pick-up pointer adjustment. The transition edge detection module 610 and the shift decision & digital loop filter & data pick-up pointer adjustment module 612 do the same thing as the combination of the transition edge detection/shift decision module 510 and the digital loop filter & data pick-up pointer adjustment module 512. The transition edge detection module 610 and the shift decision & digital loop filter & data pick-up pointer adjustment module 612 are also examples of the quality controller 408 shown in FIG. 3. Any portions of functions can be separately or integrally performed by a specific module. This is merely variations of the invention.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. A data receiver for retrieving digital values transmitted through a cable, the data receiver comprising:
   an equalizer, equalizing an input signal based on a boost value to generate an equalized signal; and
   a data extractor, coupled to the equalizer, the data extractor sampling the equalized signal to extract output values by detecting transition edges of the equalized signal according to a plurality of sampled values and analyzing the locations of transition edges to select one sampled value from the plurality of sampled values as an output value per symbol period; wherein the data extractor detects signal quality of the equalized signal to adjust the boost value accordingly.

2. The data receiver as claimed in claim 1, wherein the data extractor comprises a boost value generator for control of the boost value, and the boost value generator is initialized in a calibration mode to obtain an optimal boost value based on the signal quality detected by the data extractor.

3. The data receiver as claimed in claim 2, wherein in the calibration mode:
the boost value generator incrementally adjusts the boost value of the equalizer;
the data extractor estimates signal quality of the equalized signal in response to the incremental adjustments; and
when the signal quality improvement is adjusted to an optimal boost value, the boost value generator stops the incremental adjustment, and the data receiver enters a normal mode in which the equalizer operates at the optimal boost value.

4. The data receiver as claimed in claim 2, wherein the data extractor further comprises:
an over sampler, coupled to the equalizer, the over sampler sampling the equalized signal for a plurality of symbol periods, and acquiring the plurality of sampled values per symbol period;
a buffer, coupled to the over sampler, the buffer storing the sampled values;
an edge detector, coupled to the buffer, the edge detector detecting the transition edges of the equalized signal according to the sampled values, and asserting a location signal to indicate the location of transition edges per symbol period; and
a quality controller, coupled to the edge detector, the quality controller analyzing the locations of transition edges to select one optimal sampled value as the output value for each symbol period.

5. The data receiver as claimed in claim 4, wherein:
the over sampler samples the equalized signal at five different time points in the symbol period to correspondingly acquire five sampled values, and
the quality controller selects one of the sampled values to be the output value, which is associated with a time point closest to the center of two transition edges within the symbol period.

6. The data receiver as claimed in claim 5, wherein the quality controller analyzes variation rate of the time point as an inverse index of the signal quality of an equalized signal.

7. The data receiver as claimed in claim 6, wherein:
the quality controller detects whether the time point has changed since the last symbol periods; and
the quality controller counts the total amount of changes made to the time point over a long period to be the variation rate.

8. A data retrieval method for acquiring digital values from signals transmitted through a cable, the data retrieval method comprising:
in a calibration mode:
incrementally feeding a plurality of boost values to an equalizer;
equalizing a calibration signal based on the boost values to generate corresponding equalized signals; and
estimating signal qualities of the equalized signals to determine an optimal boost value among the plurality of boost values;
in a normal mode:
using the optimal boost value to equalize signals transmitted through the cable to generate proper equalized samples; and
sampling the proper equalized signals to acquire the digital values.

9. The data retrieval method as claimed in claim 8, wherein the optimal value is obtained at a saturation point where the signal quality does not improve no matter how the boost value increases.

10. The data retrieval method as claimed in claim 8, wherein acquirement of the digital values comprises:
sampling the equalized signals corresponding to a plurality of symbol periods, and acquiring a plurality of sampled values per symbol period;
detecting transition edges of the equalized signals according to the sampled values;
asserting a location signal to indicate the location of transition edges per symbol period; and
analyzing the location signal to select one optimal sampled value as a digital value of a symbol period.

11. The data retrieval method as claimed in claim 10, wherein:
the sampling step comprises sampling the equalized signal at five different time points in the symbol period to acquire five sampled values correspondingly;
the selection of the optimal sampled value comprises selecting one of the sampled values which is associated with a time point closest to the center of two transition edges within the symbol period.

12. The data retrieval method as claimed in claim 11, wherein signal quality estimation comprises analyzing variation rates of the time point as an inverse index of the signal quality.

13. The data retrieval method as claimed in claim 12, wherein the analysis of variation rate comprises:
detecting whether the time point has changed since last symbol periods; and
counting the total amount of changes made to the time point over a long period to be the variation rate.

14. A data receiver comprising:
an equalizer, receiving an input signal and generating an equalized signal; and
a data extractor, determining a quality of the input signal based on shifts of a center sampling point and sending a boost value to the equalizer;
wherein a transfer function of the equalizer changes according to the boost value, and a particular transfer function that results in less shifts is selected.

* * * * *